June 23, 1964  J. L. GRATZMULLER  3,138,676
PRESSURE OPERATED CIRCUIT-BREAKER ACTUATING SYSTEMS
Filed Nov. 14, 1960  11 Sheets-Sheet 1

FIG.1

June 23, 1964  J. L. GRATZMULLER  3,138,676
PRESSURE OPERATED CIRCUIT-BREAKER ACTUATING SYSTEMS
Filed Nov. 14, 1960  11 Sheets-Sheet 2

INVENTOR

BY

ATTORNEY

June 23, 1964     J. L. GRATZMULLER     3,138,676
PRESSURE OPERATED CIRCUIT-BREAKER ACTUATING SYSTEMS
Filed Nov. 14, 1960     11 Sheets-Sheet 6

June 23, 1964  J. L. GRATZMULLER  3,138,676
PRESSURE OPERATED CIRCUIT-BREAKER ACTUATING SYSTEMS
Filed Nov. 14, 1960  11 Sheets-Sheet 7

June 23, 1964    J. L. GRATZMULLER    3,138,676
PRESSURE OPERATED CIRCUIT-BREAKER ACTUATING SYSTEMS
Filed Nov. 14, 1960    11 Sheets-Sheet 9

June 23, 1964  J. L. GRATZMULLER  3,138,676
PRESSURE OPERATED CIRCUIT-BREAKER ACTUATING SYSTEMS
Filed Nov. 14, 1960  11 Sheets-Sheet 11

United States Patent Office
3,138,676
Patented June 23, 1964

3,138,676
PRESSURE OPERATED CIRCUIT-BREAKER
ACTUATING SYSTEMS
Jean Louis Gratzmuller, Neuilly-sur-Seine, France
Filed Nov. 14, 1960, Ser. No. 69,199
Claims priority, application France Nov. 13, 1959
9 Claims. (Cl. 200—82)

This invention relates to actuating systems for electric circuit-breakers, more especially for high-tension lines, and is more particularly, but not exclusively, applicable to circuit-breakers with "tulip" type contacts.

In high-tension circuit-breakers, it is desirable that, at the instant of separation of the contacts, the movable contact should be moving at high speed and that a high speed be maintained substantially throughout the circuit-breaking movement, in order to quench the opening arc as quickly as possible. It is also desirable that in the circuit-making movement the movable contact should approach the fixed contact at high speed until the instant at which it effectively engages the fixed contact in order to quench the closing arc as soon as possible after it has been struck. It is further desirable that the final stages of the circuit-making and circuit-breaking movements, during which the movable contact is brought to rest, should be well damped in order to eliminate shock or rebound, but that, in the circuit-making movement, damping should not start until contact is made.

Now the penetration of the movable conact into the fixed contact is normally very short compared with the total travel of the movable contact; and the problems of accelerating the movable contact to a high speed in the circuit-breaking movement and of decelerating it, with damping, in the circuit-making movement, over such a short distance of travel, present difficulties. Likewise, the deceleration from high speed of the movable contact, with damping, in the circuit-breaking movement and its acceleration to high speed in the circuit-making movement, over a similarly short distance of travel, which is desirable, present similar difficult problems.

An object of this invention is a circuit-breaker actuating system comprising an actuator, preferably a fluid-pressure actuator, whose movable output member is connected to the movable contact member (or members) of the circuit-breaker by a kinematic linkage having a variable "gear-ratio" of contact member displacement to output member displacement such that this ratio is considerably less at and near the ends of the output member's stroke than its average value over the remainder of the stroke, the said ratio preferably passing through zero values and reversing its algebraic sign shortly before the said stroke is completed in each direction.

A further object of the invention is a circuit-breaker actuating system as above described including means for damping the motion of the actuator output member operative only during a final fraction of its stroke in the circuit-making direction (and preferably in the circuit-breaking direction as well) but not otherwise, said final fraction of the circuit-making stroke preferably corresponding approximately with the final fraction of the contact member's movement over which it is in contact with the complementary fixed contact member.

A still further object of the invention is a system as above described in which the kinematic linkage comprises a crank, so actuated by said output member that its angular displacement is proportional to the output member's displacement, and a pin-jointed link connecting said crank with said movable contact member, the arrangement being such that the total angular range of the crank's movement is about, and preferably rather more than, half a revolution and that the crank-link-combination has two dead center positions within the said crank angle range and respectively occurring near one end and the other of said range.

The variation of gear-ratio thus provided enables the movable contact member to be accelerated to a high speed over a very small travel by means of a much smaller force than would be needed if the actuator's output member were directly connected to the movable contact member; and the application of the damping effort to the actuator output member rather than to the movable contact member itself, coupled with the variable gear-ratio, by spreading the damping action over a considerable fraction of the total travel of the damped member, facilitates the provision of effective damping, and smooth and progressive retardation of the movable contact member, which would be very difficult to achieve if the damping effort were applied to the movable contact member itself.

How the foregoing objects and such others as may hereinafter appear are achieved, and the nature of the invention generally, will be more fully understood from the following description, having reference to the accompanying drawings, of several embodiments of the invention, given by way of example only and without implied limitation of the scope of the invention, which is defined in the hereto appended claims.

Figure 1:
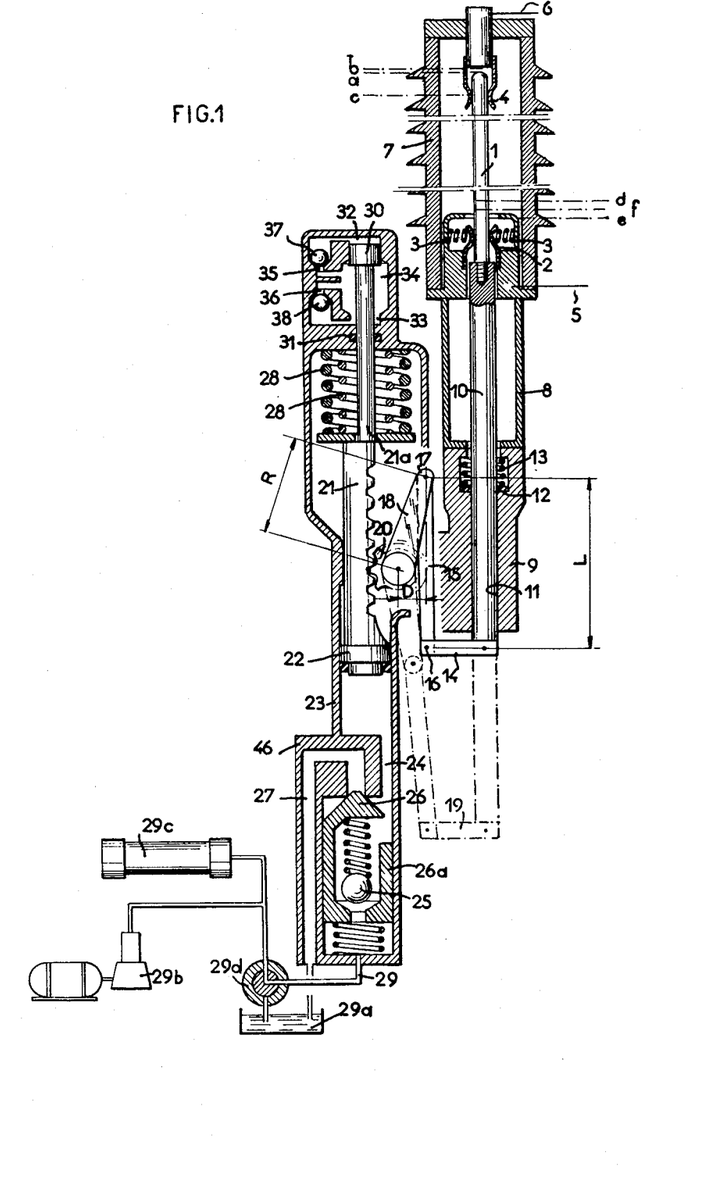
FIGURE 1 is a schematic vertical section of a first embodiment of the invention comprising a circuit-breaker with tulip contacts and a hydraulic jack with spring return, actuating the movable contact member of the circuit-breaker through mechanism comprising a rack and pinion and a crank and a link motion.

Referring to FIGURE 1, the circuit-breaker, interposed between two sections 5 and 6 of a high tension line, comprises an oil-filled, porcelain, insulating pot 7 closed at the top by a conducting member electrically connected to the line section 6 and carrying a fixed tulip contact member 4, and headed at the bottom by a conducting member electrically connected to the line section 5 and carrying a tulip contact member 2. The rod-like movable contact member 1 of the circuit-breaker slides in the contact member 2, with which a good, permanent, electrical contact is maintained by springs 3. In the figure the upper end of the movable contact member 1 is engaged in the upper tulip contact member 4. The contact member 1 is screwed into an extension rod 10 which extends with clearance through a central perforation of the header member at the lower end of the pot 7 and is enclosed in a conducting tube 8, likewise oil-filled, connecting the said header member with a body 9, in a bore 11 of which the rod 10 is slidably mounted. Leakage of oil filling the pot 7 and tube 8 between the rod 10 and bore 11 is prevented by a fluid-tight packing ring 12 loaded by a spring 13.

To the lower end of the rod 10 is fixed a transversely extending arm 14 to the end of which is pivoted at 16 the lower end of a link 15 whose upper end is pivoted at 17 to a crank 18 mounted on a shaft journalled in the body 9 and carrying a spur pinion 20 engaged with a toothed rack 21 formed in one piece with the piston 22 of a single-acting hydraulic jack whose cylinder 23 is formed in one piece with the body 9. The rack 21 is housed in an extension of the body 9 which also encloses a pair of return springs 28 trapped between the upper wall of the rack housing and an abutment plate fixed to the top of the rack.

Below the cylinder 23 is a feed and rapid exhaust device 46 (here shown as integral with the cylinder) in which device is formed a cylindrical chamber communicating with the interior of the cylinder via a duct 24, which also communicates with the interior of a hollow piston 26a which slides in the said cylindrical chamber and whose upper end 26, of frusto-conical form, is normally seated by a spring on a port leading to a large bore exhaust channel 27, which communicates with a sump 29a. The lower end of the piston 26a is perforated providing communication between the interior of piston 26a and a duct 29, such perforation forming a seating for a spring-loaded ball 25 inside the piston 26a. Duct 29 is selectively connectible by a cock 29d with the sump 29a or with the feed system of the jack 23, 22 comprising a pump 29b and hydro-pneumatic accumulator 29c.

Formed in one piece with the housing of rack 21 is a casing enclosing a dash-pot and separated from the rack-housing space by a partition forming the upper wall of the rack-housing and the lower wall of the dash-pot casing. This partition is perforated to provide a sliding bearing, sealed by a packing ring 31, for an upward extension 21a of the rack 21. In the dash-pot casing is formed a chamber 34 whose upper and lower walls have coaxial cylindrical openings 32, 33, in which an enlarged head of extension 21a forming a piston 30 is slidably engageable with fine clearance, the inside diameter of chamber 34 being considerably larger than the diameter of the piston 30. Piston 30 only engages in the cylindrical openings 32, 33 over a small fraction of its total stroke at each end of such stroke. The openings 32, 33 communicate with by-pass channels 35, 36, which lead back into the chamber 34 and contain non-return ball valves 37, 38, which allow flow from chamber 34 towards the openings 32, 33, respectively, but not in the reverse direction.

Upward displacement of the jack piston 22 and rack 21 rotates the crank 18 clockwise and conversely, the total angular travel of the crank between the extreme positions, indicated respectively in full and dotted lines, being 203°. Within this angular range of crank movement, the linkage constituted by the crank 18 and link 15 has two dead-center positions separated by 167° of angular crank displacement.

The operation of the system illustrated in, and substantially described with reference to, FIGURE 1 is as follows:

Starting from the position in which the circuit-breaker is fully open and the jack piston 22 is at the bottom of its stroke, the crank 18 and link 15 are in the position shown in dotted lines, the selector cock 29d being turned to the position for connecting duct 29 to the sump 29a, the cock 29d is then turned to the position connecting duct 29 to the feed system 29b, 29c. Hydraulic liquid under pressure is then transmitted to the base of the cylindrical chamber containing the hollow piston 26a. This pressure, while holding the frusto-conical head 26 of piston 26a seated to block the exhaust channel 27, unseats the ball 25, thereby admitting the pressure liquid, via duct 24, to cylinder 23. Piston 22 and rack 21 are therefore driven upwards compressing springs 28 and storing energy therein, at the same time rotating crank 18 clockwise.

At the beginning of this movement, the dash-pot piston 30 is engaged in the cylindrical opening 33 and its upward movement tends to pump liquid in chamber 34 into the by-pass 36, and since the ball 38 will not resist flow of liquid from chamber 34 back to the opening 33, the piston 30 encounters no appreciable resistance and the initial movement of the jack piston 22 and rack 21 is undamped. The movement of piston 22, rack 21 and crank 18 thus attains a high velocity without delay, but when the piston 22 approaches the end of its stroke the dash-pot piston 30 enters the opening 32, and since the ball 37 prevents flow of liquid from opening 32 back to chamber 34 through the by-pass 35, the liquid displaced in front of it by piston 30 must find its way back to chamber 34 through the fine clearance between piston 30 and opening 32, thus imposing heavy damping on the motion of the jack piston 22, rack 21 and the elements mechanically connected therewith. The clearance of piston 30 in opening 32 (and opening 33—see below) is preferably small enough to ensure laminar flow through it.

The full upward stroke of the jack piston 22 and rack 21 rotates the crank 18 clockwise through its full range and the link 15, operating on the arm 14, moves the rod 10 and movable contact member 1 from the fully open (circuit-breaking) position to the fully closed (circuit-making) position.

When the circuit is made, so long as the selector cock 29d is kept in circuit-making position, the feed pressure, supplied by the system 29b, 29c, is applied to the jack piston 22 to keep the movable contact member 1 fully engaged with the fixed contact member 4.

On operating the selector cock 29d to connect duct 29 to the sump 29a, the feed pressure is shut off from the base of the cylindrical chamber containing the piston 26a and the pressure still subsisting in the jack cylinder 23, maintained by the effort of the (compressed) springs 28, seats the ball 25, and acting on the piston 26a, resisted only by the weak effort of the spring by which piston 26a is loaded, drives piston 26a down to unseat its frusto-conical head 26 from the port communicating with the large-bore exhaust duct 27, thus relieving the pressure holding up the jack piston 22, which therefore descends under the effort of springs 28.

The dash-pot does not damp this movement initially, since the ball 37 allows liquid to flow freely from chamber 34 to the opening 32. Consequently, the downward movement of jack piston 22 and rack 21 gathers speed rapidly and causes a rapid disengagement of the movable contact member 1 from the fixed contact member 4 and an accelerated motion of the movable contact member towards the fully open (circuit-breaking) position.

However, when the piston 22 and rack 21 approach the end of their circuit-breaking stroke, the piston 30 enters the cylindrical opening 33 and the ball 38 prevents liquid displaced in front of it by the piston 30 from returning to chamber 34 via the by-pass 36. This displaced liquid must therefore return to chamber 34 through the fine clearance between piston 30 and opening 33, thus heavily damping the motion of the piston 22, rack 21 and the parts operatively therewith.

It is therefore evident that the circuit-making and circuit-breaking strokes of the jack piston 22 and rack 21 are only damped at the end of these strokes and over a fraction of each of them.

However, the kinematic linkage essentially comprising the crank 18 and link 15 insures that the damping action operates over a considerably smaller fraction of the total stroke of the movable contact member 1, since the gear-ratio of movement of the rack 21 to movement of the movable contact member 1 is a maximum when the crank 18 is about half-way between its extreme position and almost negligible when the crank 18 is near either of its extreme positions and in fact zero when the crank 18 and link 15 are at their two dead center positions.

Figure 2:
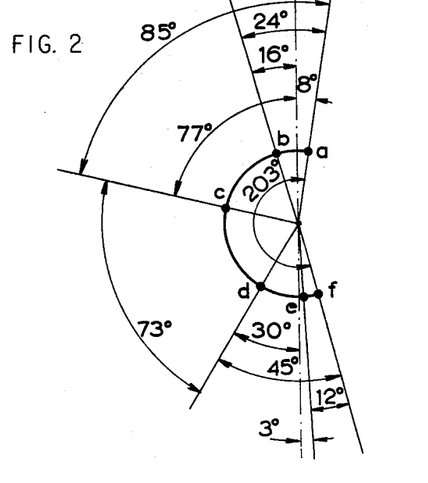
FIGURES 2 to 5 are diagrams illustrating the operation of the embodiment of FIGURE 1, FIGURE 2 being an angular diagram relating to the movement of the crank, FIGURE 3 being a linear diagram relating to the movement of the movable contact member, FIGURE 4 being a graph in which the crank angle, the gear-ratio of displacement of the movable contact member to crank angle and the speed of the movable contact member are plotted against the displacement of the movable contact member, and FIGURE 5 a graph in which the return spring force is plotted against the crank angle.
Figure 3:
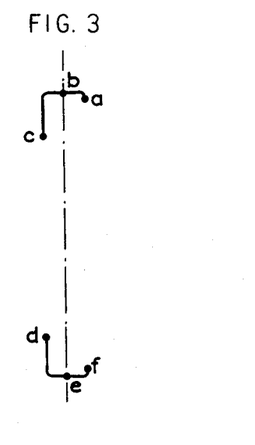
Figure 4:
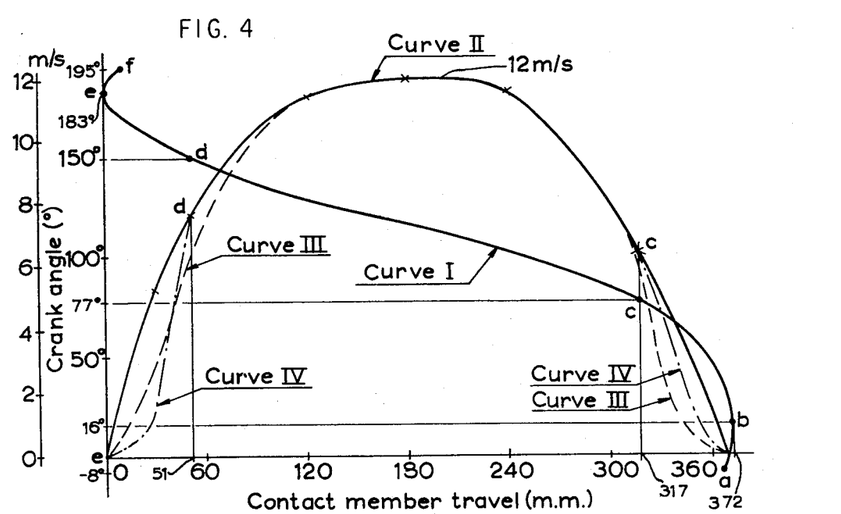

This will be better understood by reference to the diagrams of FIGURES 2 to 4, which relate to a specific example with numerical parameters.

In this example:

The crank radius R (FIGURE 1) is 184 mm.;

The length L (FIGURE 1) of the link 15, between the pivot axes 16, 17, is 274 mm.;

The distance D (FIGURE 1) between the pivot axis 16 and the vertical plane containing the axis of crank 18 is 25 mm.;

Different positions of the extremity of the movable contact member 1 of importance in the operation of the system are indicated by the letters $a$, $b$, $c$, $d$, $e$, $f$ in FIGURES 1, 3 and 4 and the corresponding angular positions of the crank 18 are identified by the same reference characters $a$ to $f$ in FIGURES 2 and 4.

In FIGURES 1 to 4 the particular positions of the movable contact member 1 and of the crank 18 identified by the reference characters $a$ to $f$ are as follows:

$a$ and $f$ are the terminal positions of circuit-making and circuit-breaking respectively;

$b$ and $e$ are the top and bottom dead centers respectively of the crank and link combination 18, 15;

$c$ and $d$ are the positions at which the damping of the motion starts in the circuit-making and circuit-breaking movements respectively.

Referring to FIGURES 1 and 3, it will be seen that, in the circuit-breaking movement, the initial movement of the movable contact member 1, from $a$ to $b$, slightly increases its penetration into the fixed contact member 4. In the subsequent movement from $b$ to $c$ the movable contact member is progressively withdrawn from the fixed contact member 4. For reasons previously explained, this first stage ($a$ to $c$) of the movement is undamped. From $c$ to $d$ the distance separating the contact members 1, 4 increases progressively. At position $d$ damping of the motion starts and the motion continues, in the same direction, with damping from $d$ to $e$. Finally, the direction of motion is reversed, through a very short distance, from $e$ to $f$.

In the circuit-making movement, the above sequence is reversed, the motion being damped only over the final stage from $c$ to $a$. The position $c$ at which the damping begins is reached at or just after first contact between the members 1 and 4.

Referring to FIGURE 2, the full travel of the crank 18, from $a$ to $f$ and conversely, is 203°. From $a$ to $b$ the crank moves through 24°, from $b$ to $c$ through 61°, from $c$ to $d$ through 73°, from $d$ to $e$ through 33° and from $e$ to $f$ through 12°. In the circuit-making movement ($f$ to $a$) the final 85° of movement ($c$ to $a$) is damped and in the circuit-breaking movement the final 45° of movement ($d$ to $f$) is damped. Thus, in the circuit-making movement the damped part of the crank movement is $85/203 \approx 42\%$ of the whole travel and in the circuit-breaking movement the ratio of damped to total travel is $45/203 \approx 22\%$.

Due to the variable gear-ratio between the angular displacement of the crank 18 (which is proportional to the linear displacement of the jack piston 22 and rack 21, by a factor depending on the ratio of the radius of the crank 18 to the radius of the pitch-circle of the pinion 20) and the linear displacement of the movable contact member 1 brought about by the nature of the crank-link combination 18, 15, the damped fraction of the contact member's travel in both directions is a smaller proportion of the whole than is the case with the crank, as shown by curve I of FIGURE 4. Thus, the damped portion ($c$ to $b$) of the contact maker's circuit-making travel covers 55 mm., i.e. $55/372 \approx 15\%$ of the total travel from $e$ to $b$, and in the circuit-breaking movement the corresponding ratio of damped travel ($d$ to $e$) to total travel ($b$ to $e$) is $51/372 \approx 14\%$.

As already explained, the motion of the contact member 1 is reversed at positions $b$ and $e$ and the consequent retraction of the contact member from position $b$ to position $a$ is 5.5 mm. and from position $e$ to position $f$ is 7.5 mm. The total effective travel of member 1 is therefore 359 mm.

Curve II of FIGURE 4 shows the variation of gear-ratio between the angular displacement of the crank 18 and the linear displacement of the contact member 1. This curve illustrates graphically that over the "free" travel of the contact member 1, i.e. when it is fully disengaged from the fixed contact member 4 and is not near the end of its circuit-breaking movement (or the start of its circuit-making movement) the movement-ratio, contact member 1 to crank 18, is high and at the beginning and end of its stroke in both directions is low, tending to and ultimately reaching zero.

Now, if the jack piston 22 and rack 21 moved with constant speed throughout the whole of their stroke in each direction, the curve II of FIGURE 4 would, subject to an appropriate constant conversion factor, represent the speed of movement of the contact member 1; but, due to the damping of the final stages of the motion in each direction, and to the inertia of the moving parts, the speed of movement of the jack piston 22 and rack 21 is not uniform. Once the damping starts, by engagement of the dash-pot piston 30 in either of the cylindrical openings 32 or 33, deceleration of the jack piston-rack assembly 22, 21 is immediately augmented. Moreover, due to the inertia of the moving parts, acceleration of their motion to the maximum speed occupies an appreciable fraction of their stroke in each direction, even though the acceleration stage of the motion is not damped.

Considering the indications of FIGURES 2 and 4 together (and see also FIGURE 1) it is evident that, in the circuit-breaking movement, the crank 18, and the piston 22 and rack 21, traverse $85/203 \approx 42\%$ of their total stroke ($a$ to $c$, FIGURE 2) before contact is severed, giving ample scope for acceleration to near maximum speed ($c$, FIGURE 4) of the movable contact member 1, this speed being slightly increased after breaking contact, so that the opening arc is rapidly extinguished. It will also be evident that, in the circuit-making movement, the movable contact member 1 approaches the fixed contact member 4 with great rapidity, thus extinguishing the closing arc almost as soon as it has been struck. Further, the circuit-making movement is effectively damped over a short travel ($c$–$b$, FIGURES 1, 3) of the movable contact member 1 and over a relatively long travel ($c$–$b$, FIGURES 2 and 4) of the crank 18 and hence of the jack 21 and jack piston 22.

The start of the circuit-making movement ($f$–$d$, FIGURES 2, 3 and 4) is undamped, thus allowing unresisted acceleration, while its final stage is damped over a short travel ($d$–$e$, FIGURES 1, 3) of the contact member 1, but over a longer travel ($d$–$f$, FIGURES 2 and 4) of the crank 18, rack 21 and piston 22.

The damping of the short final stages of the circuit-making and circuit-breaking movements of the movable contact member 1, made efficient by damping considerably longer fractions of the total travel of the actuating elements (crank 18, rack 21 and piston 22) ensures that the circuit-making, and -breaking, is effected without shock or rebound.

In a typical example of the embodiment of FIGURE 1 having the dimensional values of R, L and D previously mentioned, the maximum speed of the movable contact member 1 is 12 m./s. Hence, the ordinates of curve II (full line) read on the speed scale represent the speed the movable contact member would attain at different positions of its travel if the jack piston 22 moved with uniform speed. The actual speed, taking into account inertia and damping, is represented approximately by the dotted curve III for the circuit-making movement and by the chain-dotted curve IV for the circuit-breaking movement. At the commencement of damping ($c$ for the circuit-making movement and $d$ for the circuit-breaking movement) the slope of curves III and IV respectively is discontinuous and deceleration to a very low value is very rapid as shown by curves III and IV. In the initial stages of the circuit-making and circuit-breaking movements the jack piston, rack and crank 18 are accelerated, the value of the acceleration decreasing progressively from a maximum to zero at which point their speed is a maximum. From this it follows, firstly, that during the acceleration stages the speed of the contact member 1 is less than that indicated by curve II and secondly, that the slope of curves III and IV at the point where the acceleration of the crank 18 becomes zero is not discontinuous. In practice, the speed of the crank in the circuit-breaking movement will be attained shortly after it has reached position $c$ having moved through an angle of slightly over 85° from its initial position $a$, and in the circuit-making movement after approximately the same angular travel from its initial position $f$. The corresponding positions of the contact member 1 at which maximum speed of the crank 18 is attained as read off from curve I are therefore (very approximately) 310 mm. and 110 mm. from the origin (position $e$) and curves IV and III respectively are tangent to curve II at these positions.

Figure 5:
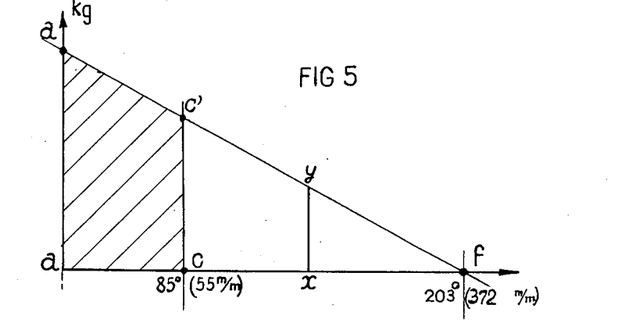
Figure 6:
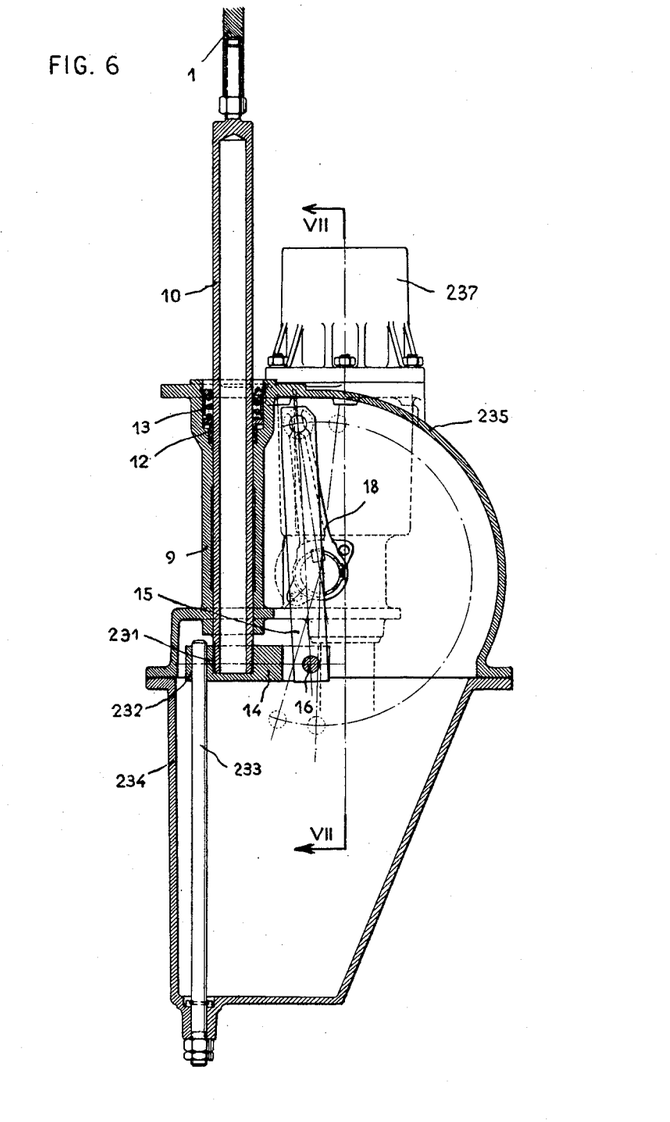
FIGURE 6 is a part-sectioned elevation of a second embodiment of the invention.
Figure 7:
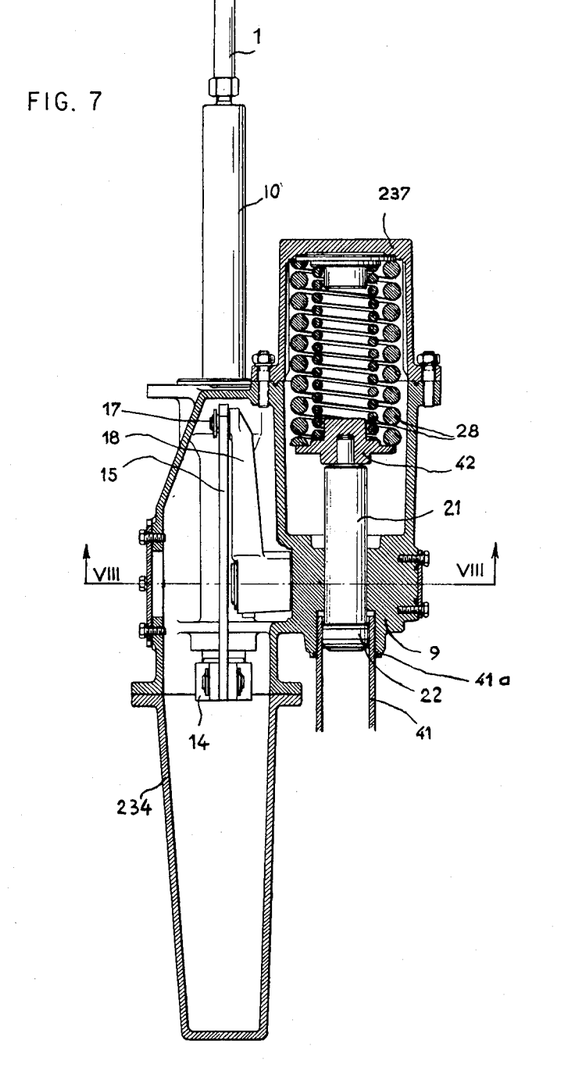
FIGURE 7 is a part sectional elevation of the same taken on the line VII—VII of FIGURE 6.
Figure 8:
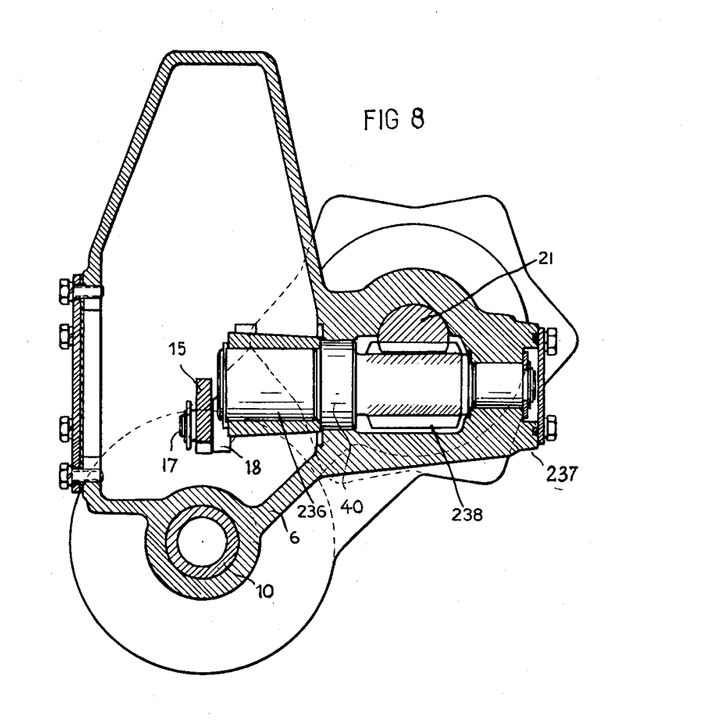
FIGURE 8 is an underneath plan section of the same taken on the line VIII—VIII of FIGURE 7.

In FIGURE 5 the force exerted by springs 28 (see FIGURE 1) is plotted (in arbitrary units) against the angular displacement of the crank 18, the corresponding displacements in mm. of the movable contact member 1 being indicated, in brackets, on the abscissa scale. The relation between spring-load and angular crank-displacement is linear.

In the circuit-making movement ($f$–$a$) energy is stored in the springs 28 equal to the work done in compressing them which, at any arbitrary stage $y$ of the movement, is proportional to the area $fxy$; and since the relation between spring-loading and crank angle is linear, this area is proportional to the square of the distance $fx$. In the circuit-breaking movement ($a$–$f$) the energy stored in the springs is progressively released. The portion of this released energy that is usefully recovered is expended in accelerating the movable contact member 1. Since the member 1 has nearly attained its maximum speed at the position $c$ (see FIGURE 4) at which the movable contact member 1 breaks contact with the fixed contact member 4 (FIGURE 1) the portion of the spring-energy fully recovered may be taken approximately as represented by the area $aa'c'c$ in FIGURE 5, so that the ratio of usefully recovered spring-energy to total energy stored in the springs in the circuit-making movement is equal to $$\frac{\text{area } aa'c'c}{\text{area } aa'f} = 1 - \frac{85^2}{203^2} \approx 0.66$$

Therefore, about ⅔ of the work done by the jack 23, 22 in compressing the springs 28 in the circuit-making movement is usefully recovered in accelerating the movable contact in the succeeding circuit-breaking movement.

FIGURES 6 to 9 illustrate a practical embodiment of a system according to the invention for actuating a single-pole circuit-breaker. Certain elements of this system are identified by the same reference characters as their counterparts in the system more schematically illustrated in FIGURE 1.

As in FIGURE 1, the movable contact member 1 of the circuit-breaker is screwed into an extension rod 10, which in this instance is hollow to reduce its weight and more especially its inertia. Rod 10 slides in a bore of the body 9 provided with a sealing gland composed of a packing ring 12 loaded by a spring 13. The lower end of rod 10 is screwed into the arm 14 which is slidably mounted on a guide rod 233 whose lower end is anchored in a casing 234 secured to the bottom of body 9. As before, the link 15 is pin-jointed at 16 to arm 14 and at 17 to the crank 18. The relationships of the dimensional characteristics of the crank-link combination, viz. the angular range of crank movement and the lengths R, L and D (especially the latter) which, inter alia, determine the dead center positions, are not quite the same as in FIGURE 1, but the operation is not materially affected.

The crank-link mechanism is housed in a casing 235 integral with the body 9.

Crank 18 is keyed on the end 236 of the shaft 40, journalled in body 9, of a pinion 238 engaging the rack 21, which is slidable in a bore of the body 9 and is integral with the jack piston 22 (FIGURE 7) which slides in the cylinder 41, the latter being screwed into the body 9 and sealed by a packing ring 41$a$.

The upper end of rack 21 carries an abutment pad 42 between which and a cap member 237, fastened by studs and nuts to the body 9, the jack piston return springs 28 are trapped.

Figure 9:
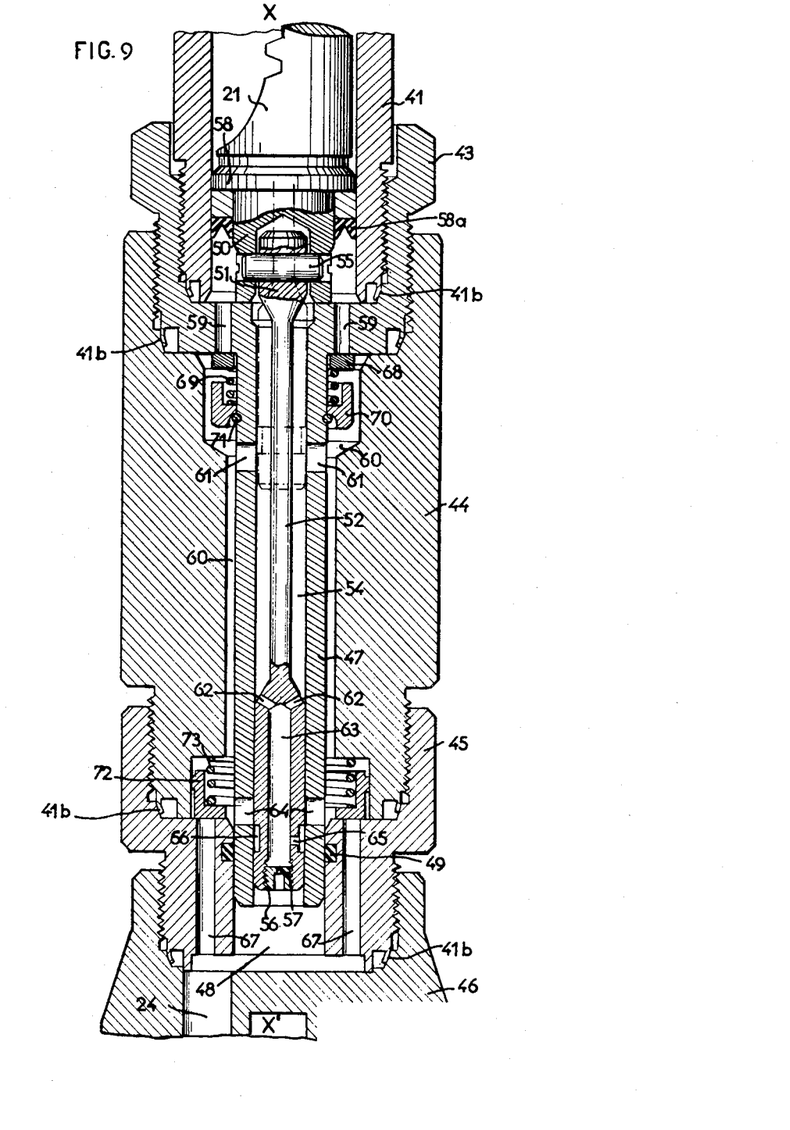
FIGURE 9 is a sectional elevation on an enlarged scale of a part of the embodiment of FIGURES 6, 7 and 8 not illustrated in those figures.

The damping device is attached to the lower end of the cylinder 41 and is illustrated in FIGURE 9. It is entirely composed of parts in the form of bodies of revolution, i.e. having circular or annular cross-sections throughout, and having a common axis X—X' (which is also the axis of cylinder 41).

FIGURE 9 shows the lower ends of the cylinder 41 and rack 21, the springs 28 being indicated diagrammatically, with an arrow showing the direction of their effort on the rack. The jack piston (22, FIGURE 7) is formed by an enlarged diameter part 58 (FIGURE 9) of the rack 21. A downwardly extending boss 50 of jack 21, of reduced diameter, defines with the cylinder wall an annular space in which is lodged, against the base of the piston 58, with an intervening spacer ring, a sealing ring 58$a$ insuring fluid-tightness of the piston 58 in the cylinder 41.

Including the lower end of cylinder 41, the fixed members of the damping device comprise the following, reading from above downwards: the cylinder 41, a nut 43, a damper body 44 and a base-cap 45. Each of these members is screwed into the one next beneath it, the base-cap 45 being similarly screwed into the body of a feed and rapid exhaust device 46 as illustrated in FIGURE 1. Fluid-tightness of each of these screwed joints is insured by deformable lips 41$b$ at the ends of the threads.

The nut 43 is formed integrally with a transverse partition perforated by ports 59 and with a downward extension 47 having an axial bore 54. Extension 47 is perforated by radial ports 61, 64 and extends into a central bore 48 of the base-cap 45 provided with a fluid-tight seal ring 49.

The damper body 44 has an axial bore 60 through which the extension 47 extends with generous clearance, thus forming an annular channel of large cross-section.

The base-cap 45 is perforated by axially extended ports 67 whose lower ends, as well as the lower end of the bore 48, communicate with the feed and exhaust duct 24 of the device 46 (see FIGURE 1).

Ports 59 are normally sealed by a disc-washer 68 loaded by a spring 69 trapped between the washer and an abutment cup washer 70 located on the extension 47 by a circlip 71. Washer 68 thus constitutes a non-return valve preventing flow through ports 59 towards the cylinder 41. Similarly, ports 67 are normally sealed by a cup-washer 72 loaded by a spring 73 trapped between the washer and a shouldering of bore 60. Washer 72 constitutes a non-return valve preventing flow through ports 67 towards the device 46.

Boss 50 has a blind bore receiving the upper end 51 of an axial rod 52 attached to boss 50 by a gudgeon pin 55. The lower end of rod 52 is considerably enlarged to form a piston 53 having a close sliding fit in bore 54. The outer surface of piston 53 is waisted to form a shallow annular groove 66 which communicates, via radial ports 65, with a blind axial bore 63 of the piston 53. The upper end of bore 63 communicates, via oblique ports 62 with bore 54 and the lower end of bore 63 is plugged by a screw-plug 56 having a small central calibrated orifice 57.

The rod 52, while stiff enough to withstand axial compression without buckling, is made sufficiently flexible to accommodate slight misalignment between the bore of cylinder 41 and bore 54, such accommodation being also assisted, if necessary, by introducing a slight looseness into the gudgeon-pin joint 50, 55, 51.

It will be evident that the particular construction of this damping device greatly facilitates machining and grinding of its several parts and their assembly and dismantling.

The device operates as follows:

Starting from the position shown in full lines in FIGURE 9, in which the circuit-breaker is fully open, admission of liquid under pressure to duct 24 unseats the non-return valve 72 and allows the liquid to flow freely, via ports 67, bore 60, ports 61 into bore 54. The pressure is thus transmitted to the blind bore of boss 50 and starts to raise the jack piston 58 allowing the liquid to flow from bore 54 into the cylinder 41 and exert its pressure on the full area of the piston 58, which therefore accelerates rapidly. When the piston 58 in approaching the top of its stroke, reaches a position corresponding to position $c$ (FIGURES 1 to 5) of the movable contact member 1, the damper piston 53 obstructs the ports 61 and the liquid must now flow through the calibrated orifice 57, bore 63, ports 62 into bore 54 above the damper piston and thence into cylinder 41. Due to this sudden, drastic restriction of the flow, causing a very large loss of head between the duct 24 and cylinder 41, the motion is now heavily damped by the springs 28, since their effort is no longer opposed by appreciable fluid pressure and is almost wholly applied to overcoming the inertia of the moving parts, while the small continuing flow of liquid into the cylinder 41 serves to prevent the jack piston from becoming separated from the liquid column and thus to suppress "water-hammer" to which such separation could give rise.

The elements of the device are so dimensioned that when the jack piston reaches the end of its upward stroke and the damping ceases the annular groove 66 of the damper piston registers with the ports 61 allowing the liquid free access to the cylinder 41, via duct 24, bore 48, bore 54, ports 64, bore 60, ports 61, groove 66, ports 65, bore 63 and ports 62, thus re-establishing the full pressure on the jack piston 58 to lock it hydraulically in the "contact-made" position.

When the feed pressure is cut-off, the springs 28 start to depress the jack piston and cause the liquid in cylinder 41 to unseat the non-return valve 68 allowing the liquid to escape freely, via ports 59, bore 60, ports 64, bores 54 and 48 and duct 24, into the device 46, which, as previously explained, enables the cylinder 41 to be exhausted rapidly.

However, when the damper piston reaches a position corresponding to position $d$ (FIGURES 1 to 5) of the movable contact member 1, it obstructs the ports 64 and for the rest of the contact-breaking stroke of the jack piston the liquid must be exhausted via ports 61, bore 54, ports 62, bore 63 and the calibrated orifice 57, thus damping the motion by dash-pot action.

Figure 10:
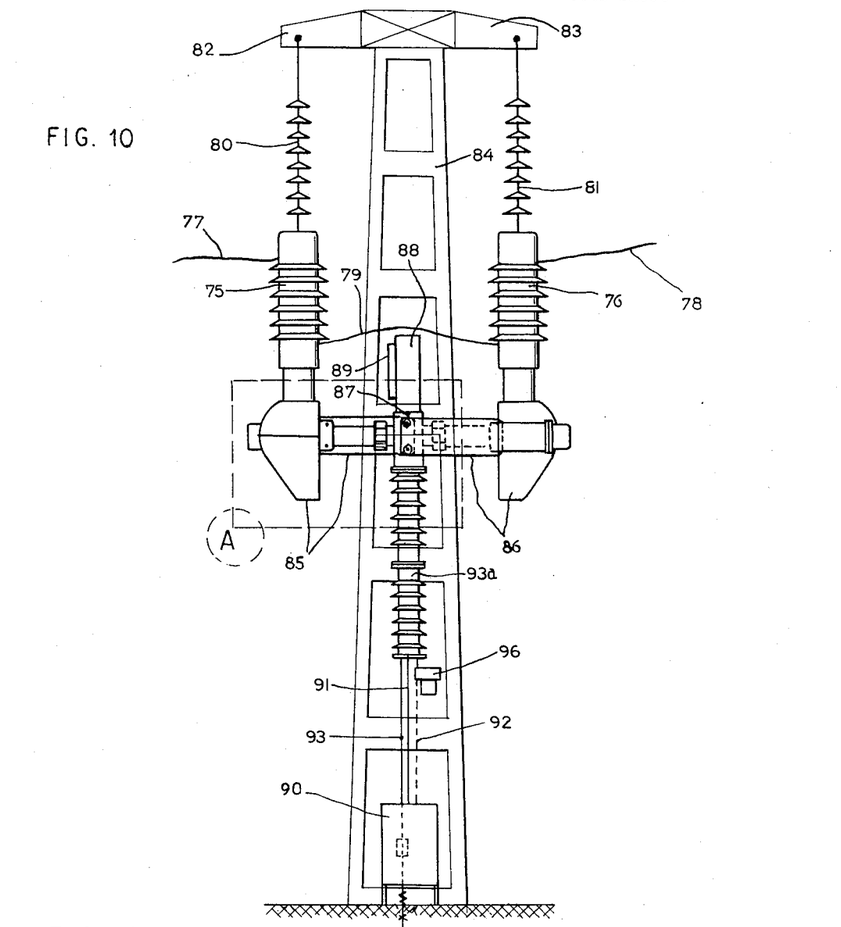
FIGURE 10 is an elevation of a circuit-breaker with two bell insulators enclosing control members connected in series, comprising a third embodiment of the invention.
Figure 11:
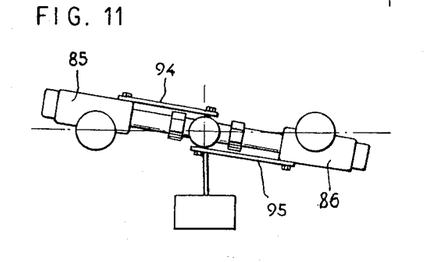
FIGURE 11 is a top plan of the circuit-breaker illustrated in FIGURE 10.
Figure 12:
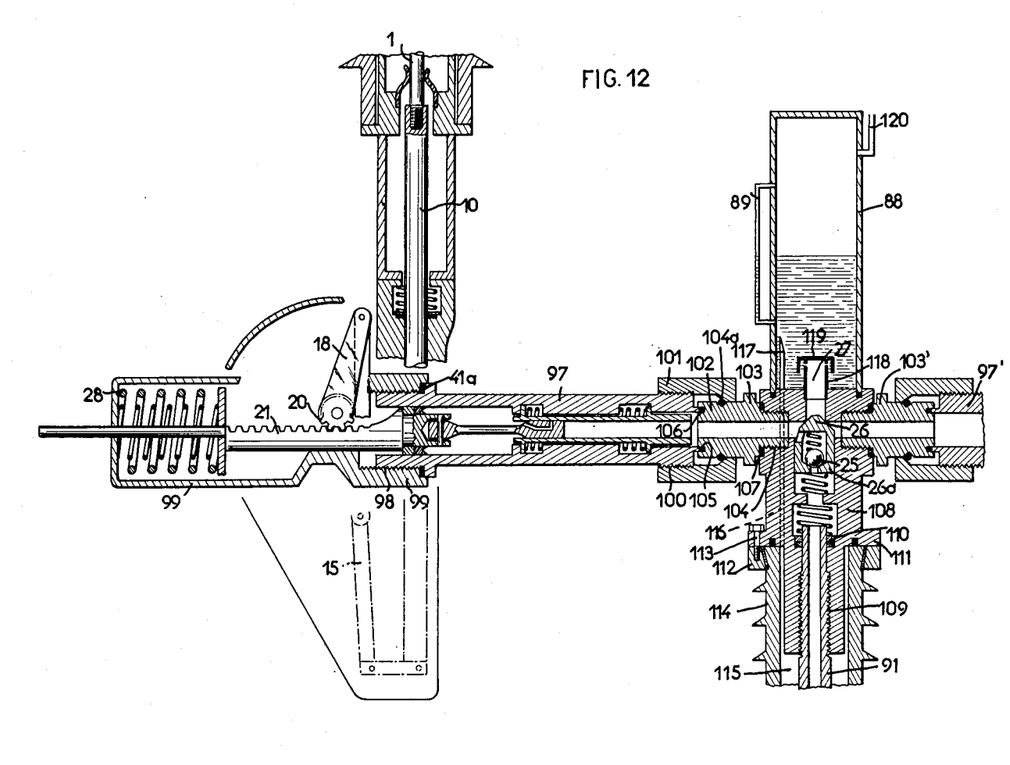
FIGURE 12 is a vertical section on an enlarged scale of part of the embodiment of FIGURES 10 and 11.

FIGURES 10 to 12 illustrate a double-break circuit-breaker operated by another embodiment of the invention. This circuit-breaker has two bell insulators 75, 76, suspended by flexible insulators 80, 81 from a gantry 82, 83 on a pylon 84, and enclosing contact assemblies operating between two sections of transmission line 77, 78 being connected in series by a conductor 79.

Beneath each bell insulator 75, 76 is mounted an actuating system, generally indicated at 85, 86 (FIGURE 10) similar to that illustrated in FIGURES 6 to 9, but differing therefrom in that whereas the link 15, arm 14, rod 10 and contact member 1 move vertically, the rack 21 moves horizontally (see FIGURE 12). The actuating systems 85, 86 are connected to single, feed and rapid exhaust device 87 (FIGURE 10) similar to the device 46 of FIGURE 1, above which is mounted an intermediate exhaust receiver 88 fitted with a gauge glass 89 and an atmospheric vent 120 (FIGURE 12). A single feed pipe 91, corresponding to the pipe 29 of FIGURE 1, connects the device 87 with the control box 90 which contains a sump corresponding to sump 29a of FIGURE 1 and connected to the receiver 88 by a single exhaust pipe 92 in the run of which is an oil-retaining valve 96. Pipe 91 is of insulating material and is partly enclosed within an insulating column 93a suspended from the device 87 and anchored by a cable 93; and pipe 92 communicates with the hollow interior of column 93a which communicates with the receiver 88, via a duct 116 terminating in a standpipe 117 (see FIGURE 12). Valve 96 serves to maintain the dielectric state of the column 93a.

Referring to FIGURE 12, which is a sectional enlargement of the part of FIGURE 10 enclosed in the dash-line rectangle A, and in which the principal elements having counterparts in FIGURE 1 are identified by the same reference characters, the arm 14, link 15, crank 18, pinion 20, rack 21 and springs 28 of the system actuating the left-hand circuit-breaker (as seen in FIGURE 10) are enclosed in a housing 99. A screw-threaded joint 98, provided with a sealing ring 41a, connects housing 99 to a body 97, in the left hand end of which is formed the cylinder of the actuating jack, corresponding to cylinder 41 of FIGURE 9 and the right hand end of which corresponds to the damper body 44 of FIGURE 9 and contains the elements of a damping device as illustrated in FIGURE 9 (and schematically in FIGURE 12) the rod of the damper piston being connected to the rack 21, part of which constitutes the jack piston, as in FIGURE 9.

The right hand end of body 97 is connected by a screw-threaded joint 100 to a union nut 101 which secures an adaptor 103 to the body 97, the shank 102 of adaptor 103 having a circumferential groove in which is lodged a piano-wire circlip 104a against which the nut 101 bears and the shank 102 having at its end a circular groove 106 provdided with a sealing ring and receiving an annular rib 105 on the end of body 97 for mutually centering the body 97 and adaptor 103. A screw-threaded joint 104, sealed by a packing ring 107, secures the adaptor 103 to a body 108 of a feed and rapid exhaust device, corresponding to the device 46 etc. of FIGURE 1 common to both circuit-breaker actuating systems, the jack cylinder and damper body of the right-hand actuator system and its adaptor being indicated in FIGURE 12 by 97' and 103' respectively.

The large-bore exhaust duct 27 normally obstructed by the end 26 of the piston 26a of the feed and exhaust device (see also FIGURE 1) is formed in the body 108 and extends upwards into the receiver 88 terminating in a standpipe 118 provided with an anti-splash cap 119. The exhaust duct 116 previously mentioned is formed in the body 108 and communicates with an annular space 115 inside the porcelain outer tube 114 of the insulating column 93a (FIGURE 10) surrounding the pipe 91 previously mentiond. Pipe 91 is connected to a downward extension of body 108 by a screw-threaded joint 109 sealed by a spring-load packing ring 110. The upper end of the porcelain tube 114 is secured to the body 108 by a clamping ring 112 having a female frusto-conical surface complementary to a male frusto-conical surface of the porcelain tube. Ring 112 is connected to a flange 111 of the body 108 by clamping bolts 113.

The above described structure of a duplex actuating system for a double-break, series circuit breaker is simple, rigid and economical, in being composed of a small number of parts interconnected by coaxial (horizontal) screw-threaded joints and in having a single feed and exhaust device 87 and a single control box 90 (FIGURE 10) common to both parts of the duplex actuating system, thus simplifying the external hydraulic connections. Moreover, the various elements of the actuating system 85 (FIGURE 10) viz. 99, 97, 101, 103, 14, 15, 18, 20, 21, 28, etc. (FIGURE 12) are identically similar to the corresponding parts of the other such system 86 (FIGURE 10) and are therefore interchangeable. Furthermore, the use of a single control box 90 and feed and exhaust device 87 common to both actuating systems 85, 86 (FIGURE 10) ensures that both circuit-breaking assemblies 75, 76 are actuated synchronously both in making and breaking the circuit.

To overcome the tendency of torsional loads, imposed on the coaxial assemblies 99, 97, 101, 103 (FIGURE 12) 85, 86 (FIGURE 10) by the circuit-making and -breaking action, due to the offsetting of the contact members 1 and rods 10 from the axis of the assemblies 99 etc., to unscrew the joints 98, 100, 104 (FIGURE 12) anti-torque flat bars 94, 95 are bolted at one end to the device 87 and at the other end to the housings 99 (FIGURE 12) of the actuating systems 85, 86, respectively, as shown in FIGURE 11, which also shows that the whole arrangement is absolutely symmetrical with respect to the vertical axis of the device 87, column 93a and pipe 91.

Figure 13:
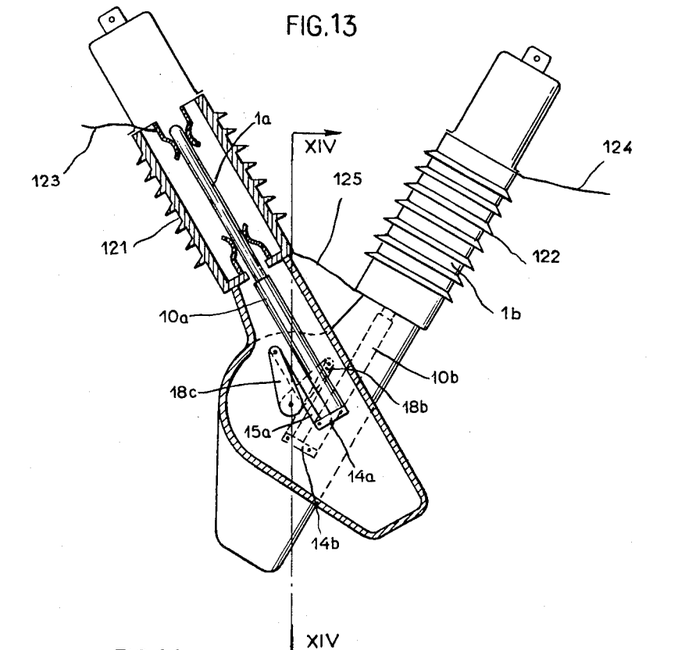
FIGURE 13 is a partly sectioned elevation of a fourth embodiment of the invention.
Figure 14:
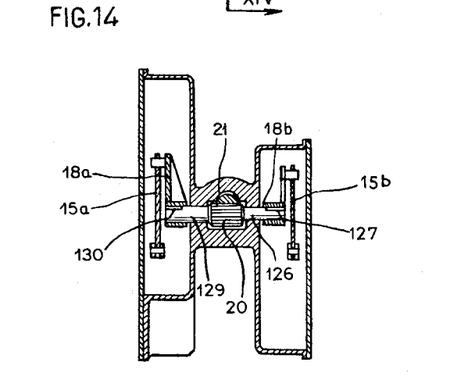
FIGURE 14 is a partial section taken along the line XIV—XIV of FIGURE 13.

FIGURES 13 and 14 illustrate yet another embodiment of the invention for actuating a double-break, series circuit-breaker with its two bell insulators 121, 122 mutually inclined at an acute angle. The line sections connected through the circuit-breaker are shown at 123, 124 and the series connection at 125. Elements of this embodiment having counterparts in FIGURE 1 are identified by the same reference characters, but differentiated by additional characters a and b (e.g. 1a, 14b) where they are duplicated. This embodiment has a single fluid-pressure actuator with a single damping device, not illustrated in FIGURES 13, 14, but as illustrated in FIGURE 9, operating a single rack 21 and pinion 20, whose shaft extends on both sides of the pinion as shown in FIGURE 14. The assembly also includes a single feed and rapid exhaust device, not illustrated in FIGURES 13, 14, but as illustrated at 46 in FIGURE 1. To opposite ends 129, 126 of the shaft of pinion 20 are secured, by keys 130, 127, cranks 18a, 18b respectively set at an acute angle, equal to the angle between the axes of the bell installations 121, 122, to one another. As in FIGURE 1 or in FIGURES 6 to 9, crank 18a is connected by a pin-jointed link 15a to an arm 14a secured to a rod 10a of which the movable contact member 1a enclosed in the bell insulator 121 is a prolongation. Similarly, the crank 18b is operatively connected to the other movable contact member 1b by link 15b, arm 14b and rod 10b. This embodiment is even more compact and has fewer component parts than that of FIGURES 10, 11 and 12.

Figure 15:
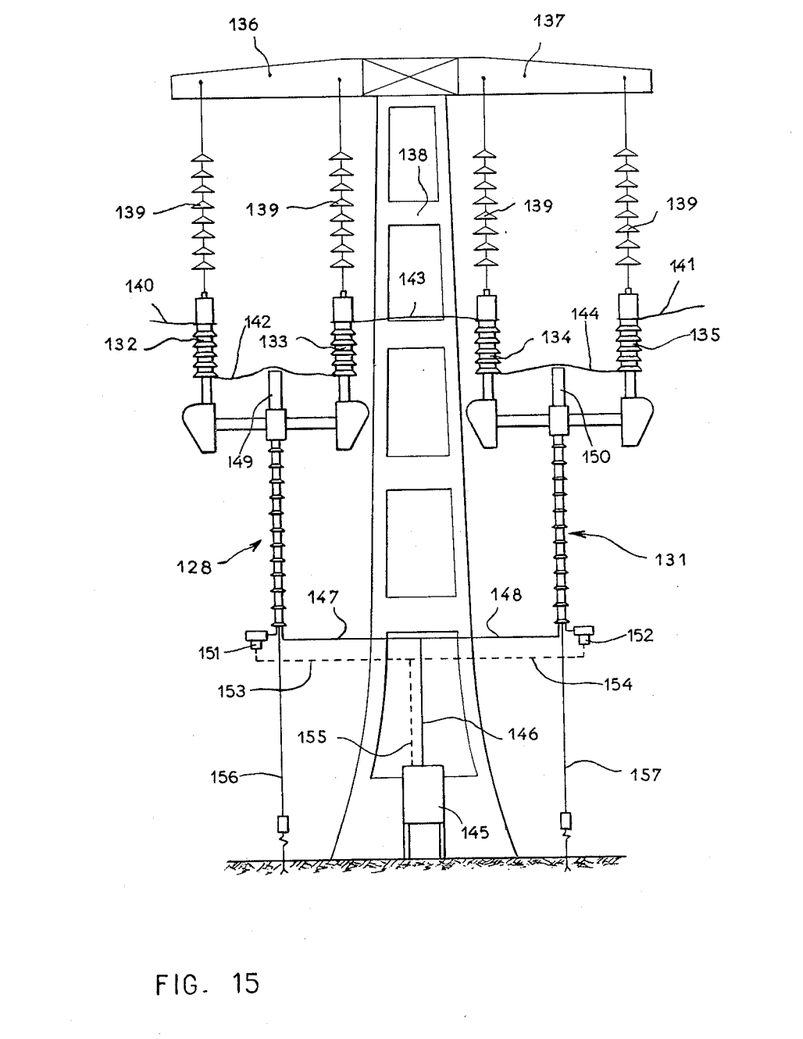
FIGURE 15 is an elevation of a circuit-breaker comprising a series of four bell insulators operated by a control system according to the invention.

FIGURE 15 illustrates a circuit-breaker installation which is in effect a duplication of the installation of FIGURES 10 11 and 12 having four bell insulators 132, 133, 134, 135 suspended from a gantry 136, 137, by means of suspension insulators 139 and enclosing circuit-breaker contact members as illustrated in FIGURE 1 connected in series by conductors 142, 143, 144 between line sections 140, 141. Gantry 136, 137 is mounted on a pylon 138. The movable contact members in the bell insulators 132, 133 are operated by an actuating system 128 as illustrated in and described with reference to FIGURES 10, 11 and 12; and similarly the movable contact members in the bell insulators 134, 135 are operated by an exactly similar system 131. The feed pipes, intermediate receivers, oil retaining valves and exhaust pipes (corresponding respectively to elements 91, 88, 96 and 92 of FIGURE 10) of these two similar systems are indicated at 147, 149, 151, 153 and at 148, 150, 152, 154, respectively. A single control box 145 for the whole installation is connected by a common feed pipe 146 to pipes 147, 148 and by a common exhaust pipe 155 to pipes 153, 154. 156, 157 are the anchorage cables of the systems 128, 131 (as in FIGURE 10).

Figure 16:
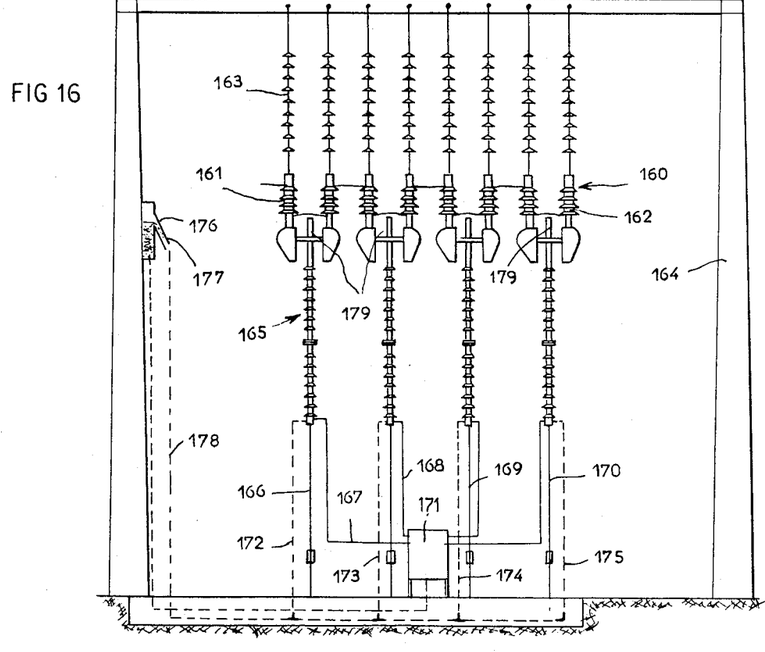
FIGURE 16 is a similar view of a circuit-breaker with a series of eight bell insulators.

FIGURE 16 illustrates a circuit-breaker installation consisting in effect of four installations of the kind illustrated in FIGURES 10, 11 and 12, providing eight breaks in series between the line sections 161, 162. The installation has eight bell insulators 160, eight suspension insulators 163, four actuating systems 165, four intermediate receivers 179, four anchorage cables, such as 166, 169, 170, four feed pipes, such as 167, 168 (corresponding to pipe 91 of FIGURE 10) and four exhaust pipes 172, 173, 174, 175 (corresponding to pipe 92 of FIGURE 10), all four feed pipes 167, 168 being connected to a single control box 171 and the exhaust pipes 172–175 being connected to a common line 178 connected to the control box 171 via a standpipe 177 and auxiliary receiver 176 mounted on the gantry 164 at the level of the intermediate receivers 179. This latter arrangement replaces the oil retaining valves 96 (FIGURE 10) and 151, 152 (FIGURE 15) in ensuring that the insulating columns of the systems 165 (corresponding to columns 93a of FIGURE 10) are kept full of oil.

Figure 17:
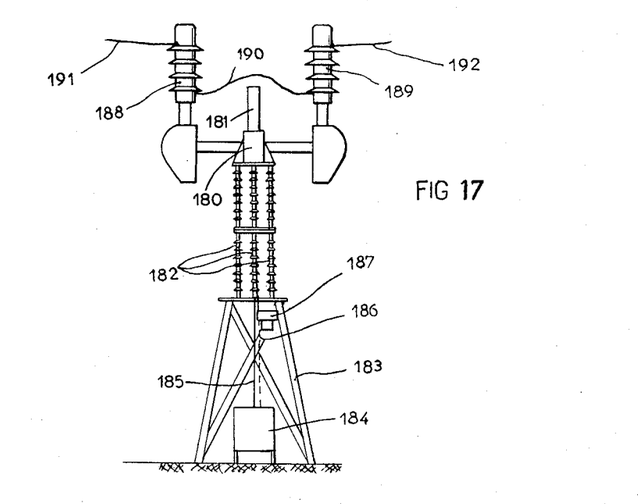
FIGURE 17 is an elevation of a double-break series circuit-breaker operated by yet another embodiment of the invention.

The installation illustrated in FIGURE 17 is similar to that of FIGURES 10, 11, 12, but differs in that the twin circuit-breakers, operating in series between the line sections 191, 192, with series connection conductor 190, instead of being suspended on a gantry, are supported from below on a rigid, triangulated, pedestal structure 183. The elements 180, 181, 184, 185, 186, 187, 188, 189 of the installation of FIGURE 17 correspond respectively with the elements 87, 88, 90, 91, 92, 96, 75, 76 of FIGURE 10. In the installation of FIGURE 17 the single insulating column 93a of FIGURE 10 is replaced by three parallel columns 182, which act as struts supporting the structure 180, 181, 188, 189 on the foundation constituted by the pedestal 183.

It is to be understood that the invention is not limited to the constructions illustrated in the accompanying drawings and described with reference thereto, but embraces all such modifications, variants and enlargements by multiplication of similar units as are within the competence of those skilled in the art and are within the spirit and scope of the invention as defined in the hereto appended claims.

Having thus described the invention, what is claimed as new and desired to be secured by Letters Patent is:

1. Actuating system for an electric circuit-breaker having a linearly movable contact member, said system comprising a single acting fluid pressure actuator embodying elastic return means with the circuit-making stroke of the actuator being effected by feeding fluid thereto and the circuit-breaking stroke being effected by said elastic return means, a straight, toothed rack actuated thereby, a toothed pinion rotatable by said rack through about half a revolution, a crank fast on said pinion and a pin-jointed link interconnecting said crank and said contact member so disposed that the crank-link combination includes two dead center positions adjacent respectively to one and the other extreme position of said crank, and means for damping the movement of the rack, with said damping means being operative only over a final fraction of the stroke of the rack in each direction.

2. Circuit-breaker actuating system as defined in claim 1, in which said actuator includes a cylinder, a power piston rigidly connected to said rack and return spring means, said system further including a member having a duct for feeding and exhausting said cylinder, and said damping means being interposed between said cylinder and said member and comprising a stationary tubular casing, a stationary tube within said casing, sealed into the ends thereof and spaced from its tubular wall, one end of said tube communicating with said cylinder and its other end communicating with said duct, said tube having radial ports near each end, a hollow damper piston slidable in said tube and operatively connected to the power piston, one end of the interior of said damper piston communicating with the interior of said tube and the other end thereof communicating through a calibrated restrictor orifice with said duct, the end walls of said tubular casing having ports communicating respectively with said cylinder and said duct and non-return valves normally sealing said last-named ports agianst flow from said tubular casing into said cylinder and said duct respectively but permitting flow from said cylinder and from said duct respectively into said tubular casing.

3. Contact-breaker actuating system as defined in claim 2, in which said damper piston is provided with a circumferential groove and ports interconnecting said groove with the interior of said damper piston, said groove being registrable with the radial ports of said tube near the end thereof next to said cylinder, when said power piston reaches the end of its fluid pressure actuated stroke.

4. Contact-breaker actuating system as defined in claim 2, in which said tubular casing comprises a tubular body and two end members, one of which members has a male screw-thread engaging a complementary female screw-thread of said tubular body and a female screw thread engaging a complementary male screw-thread of said cylinder, the other of said end members having a female screw-thread engaging a complementary male screw-thread of said tubular body and a male screw-thread engaging a complementary female screw-thread of the member having said feed and exhaust duct.

5. Contact-breaker actuating system as defined in claim 4, in which each of the four said male screw-threads terminates in a deformable lip providing a fluid-tight seal.

6. Actuating system for an electric circuit-breaker assembly comprising at least two circuit-breakers connected in series and each having a linearly movable contact member, said system comprising a single acting fluid pressure actuator embodying elastic return means with the circuit-making stroke of the actuator being effected by feeding fluid thereto and the circuit-breaking stroke being effected by said elastic return means, a straight, toothed rack actuated thereby, a toothed pinion rotatable by said rack through about half a revolution, two cranks fast on said pinion and a pin-jointed link interconnecting each said crank with one and the other movable contact member respectively, means disposing said cranks and links so that each crank-link combination includes two dead center positions respectively adjacent to one and the other extreme position of its crank, and actuator-damping means operative only over a final fraction of the actuator's stroke in each direction.

7. Actuating system for an electric circuit-breaker assembly comprising at least two circuit-breakers connected in series and each having a linearly movable contact member, said system comprising an actuator assembly connected to each of said circuit-breakers, each of said actuator assemblies comprising a single-acting fluid pressure actuator, a straight, toothed rack actuated thereby, a toothed pinion rotatable by said rack through about half a revolution, a crank fast on said pinion, a pin-jointed link interconnecting said crank with the movable contact member of the associated circuit-breaker, means disposing said crank and link so that the crank-link combination includes two dead center positions respectively adjacent one and the other extreme position of said crank, actuator-damping means operative only over a final fraction of the actuator's stroke in each direction and spring means operative on said rack to move said rack in the circuit-breaking direction, a single feed and exhaust device common to both said actuator assemblies and having a feed and exhaust duct connected to both said actuators, and a single control device connected to said feed and exhaust device for selectively feeding both said actuators with pressure fluid to move both said racks in the circuit-making direction synchronously and exhausting said actuators for allowing said spring means to move both said racks synchronously in the circuit-breaking direction.

8. Circuit-breaker actuating system as defined in claim 7, in which said circuit-breakers and their movable contact member are disposed vertically, and said actuator assemblies being mutually aligned and extending horizontally in opposite directions from said feed and exhaust device to which said assemblies are rigidly secured.

9. In an electric circuit breaker having a stationary contact member and a movable contact member adapted to be reciprocated relative to the stationary contact member between closed and open positions along a predetermined path, a source of fluid under pressure, a cylinder having a piston slidable therein, resilient means in one cylinder space, means for selectively connecting the other cylinder space to said source to move said piston against the action of said resilient means or to the exhaust to move said piston under the action of said resilient means, a crank mechanism including a crank arm rotatable by said piston and operatively related to said movable contact member for moving the latter in correspondence with the movements of said piston, said crank arm having two dead center positions separated by about 180° of crank rotation, and said piston being adapted to rotate said crank arm in one direction past one of said two dead center positions to a limit position corresponding to one end of said predetermined path, and in the other direction past the other dead center position to a limit position corresponding to the other end of said predetermined path, and damping means operative on said piston as said crank arm rotates in said one direction past one of said dead center positions and in said other direction past said other dead center position.

References Cited in the file of this patent
UNITED STATES PATENTS

| | | |
|---|---|---|
| 2,644,876 | Baker | July 7, 1953 |
| 2,676,285 | Jansson et al. | Apr. 20, 1964 |
| 2,920,607 | Barkan | Jan. 12, 1960 |